US009978175B2

(12) United States Patent
Corazza et al.

(10) Patent No.: US 9,978,175 B2
(45) Date of Patent: *May 22, 2018

(54) REAL TIME CONCURRENT DESIGN OF SHAPE, TEXTURE, AND MOTION FOR 3D CHARACTER ANIMATION

(71) Applicant: Adobe Systems Incorporated, San Jose, CA (US)

(72) Inventors: Stefano Corazza, San Francisco, CA (US); Emiliano Gambaretto, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 14/659,325

(22) Filed: Mar. 16, 2015

(65) Prior Publication Data
US 2015/0193975 A1 Jul. 9, 2015

Related U.S. Application Data

(63) Continuation of application No. 13/071,764, filed on Mar. 25, 2011, now Pat. No. 8,982,122, which is a (Continued)

(51) Int. Cl.
*G06T 15/00* (2011.01)
*G06T 17/20* (2006.01)
*G06T 13/40* (2011.01)

(52) U.S. Cl.
CPC .............. *G06T 17/20* (2013.01); *G06T 13/40* (2013.01)

(58) Field of Classification Search
CPC ................................ G06T 17/20; G06T 13/40
(Continued)

(56) References Cited

U.S. PATENT DOCUMENTS 6,047,078 A 4/2000 Kang
6,088,042 A 7/2000 Handelman et al.
(Continued)

FOREIGN PATENT DOCUMENTS

EP 1884896 2/2008
WO WO/07/132451 11/2007
(Continued)

OTHER PUBLICATIONS

Vassilev, Tzvetomir, and Bernhard Spanlang. "Efficient cloth model for dressing animated virtual people." Proc of Learning to Behave Workshop. Enschede the Netherlands:[sn]. 2000.*
(Continued)

*Primary Examiner* — Phu K Nguyen
(74) *Attorney, Agent, or Firm* — Keller Jolley Preece

(57) ABSTRACT

Systems and methods for automatically generating animation-ready 3D character models based upon model parameter, clothing selections, and texture-region color component selections are described. One embodiment of the invention includes an application server configured to receive the user defined model parameters and the at least one texture selection via a user interface. In addition, the application server includes a generative model and the application server is configured to generate a 3D mesh based upon the user defined model parameters using the generative model and to apply texture to the generated mesh based upon the at least one texture selection.

20 Claims, 11 Drawing Sheets

Related U.S. Application Data continuation-in-part of application No. 12/625,553, filed on Nov. 24, 2009, now Pat. No. 8,659,596, which is a continuation-in-part of application No. 12/584,117, filed on Aug. 31, 2009, now abandoned.

(60) Provisional application No. 61/317,653, filed on Mar. 25, 2010, provisional application No. 61/200,212, filed on Nov. 24, 2008.

(58) Field of Classification Search
USPC .......................................................... 345/420
See application file for complete search history.

(56) References Cited

U.S. PATENT DOCUMENTS

| | | |
|---|---|---|
| 6,278,466 B1 | 8/2001 | Chen |
| 6,552,729 B1 | 4/2003 | Di Bernardo et al. |
| 6,554,706 B2 | 4/2003 | Kim et al. |
| 6,700,586 B1 | 3/2004 | Demers |
| 6,714,200 B1 | 3/2004 | Talnykin et al. |
| 7,168,953 B1 | 1/2007 | Poggio et al. |
| 7,209,139 B1 | 4/2007 | Keet et al. |
| 7,372,536 B2 | 5/2008 | Shah et al. |
| 7,522,165 B2 | 4/2009 | Weaver |
| 7,937,253 B2 | 5/2011 | Anast et al. |
| 8,659,596 B2 | 2/2014 | Corazza et al. |
| 8,749,556 B2 | 6/2014 | De Aguiar et al. |
| 8,797,328 B2 | 8/2014 | Corazza et al. |
| 8,970,585 B2* | 3/2015 | Weaver .................. A41H 3/007 345/419 |
| 8,982,122 B2 | 3/2015 | Corazza et al. |
| 9,305,387 B2* | 4/2016 | Corazza .................. G06T 13/40 |
| 2002/0050988 A1 | 5/2002 | Petrov et al. |
| 2003/0164829 A1 | 9/2003 | Bregler et al. |
| 2003/0169907 A1 | 9/2003 | Edwards et al. |
| 2003/0208116 A1 | 11/2003 | Liang et al. |
| 2003/0215130 A1 | 11/2003 | Nakamura et al. |
| 2004/0021660 A1 | 2/2004 | Ng-Thow-Hing et al. |
| 2004/0049309 A1 | 3/2004 | Gardner et al. |
| 2004/0210427 A1 | 10/2004 | Marschner et al. |
| 2004/0227752 A1 | 11/2004 | McCartha et al. |
| 2005/0264572 A1 | 12/2005 | Anast et al. |
| 2006/0002631 A1 | 1/2006 | Fu et al. |
| 2006/0109274 A1 | 5/2006 | Alvarez et al. |
| 2006/0134585 A1 | 6/2006 | Adamo-villani et al. |
| 2006/0171590 A1 | 8/2006 | Lu et al. |
| 2006/0245618 A1 | 11/2006 | Boregowda et al. |
| 2006/0267978 A1 | 11/2006 | Litke et al. |
| 2007/0035541 A1 | 2/2007 | Isner et al. |
| 2007/0091085 A1 | 4/2007 | Wang et al. |
| 2007/0104351 A1 | 5/2007 | Yang et al. |
| 2007/0182736 A1 | 8/2007 | Weaver |
| 2008/0024487 A1 | 1/2008 | Isner et al. |
| 2008/0030497 A1 | 2/2008 | Hu et al. |
| 2008/0031512 A1 | 2/2008 | Mundermann et al. |
| 2008/0043021 A1 | 2/2008 | Huang et al. |
| 2008/0152213 A1 | 6/2008 | Medioni et al. |
| 2008/0158224 A1 | 7/2008 | Wong et al. |
| 2008/0170077 A1 | 7/2008 | Sullivan et al. |
| 2008/0180448 A1 | 7/2008 | Anguelov et al. |
| 2008/0187246 A1 | 8/2008 | Andres |
| 2008/0252596 A1 | 10/2008 | Bell et al. |
| 2009/0027337 A1 | 1/2009 | Hildreth |
| 2009/0067730 A1 | 3/2009 | Schneiderman |
| 2009/0153554 A1 | 6/2009 | Lim et al. |
| 2009/0195544 A1 | 8/2009 | Wrinch |
| 2009/0196466 A1 | 8/2009 | Capata et al. |
| 2009/0231347 A1 | 9/2009 | Omote |
| 2010/0020073 A1 | 1/2010 | Corazza et al. |
| 2010/0073361 A1 | 3/2010 | Taylor et al. |
| 2010/0133490 A1 | 6/2010 | Corazza et al. |
| 2010/0149179 A1 | 6/2010 | Aguiar et al. |
| 2010/0238182 A1 | 9/2010 | Geisner et al. |
| 2010/0253703 A1 | 10/2010 | Ostermann |
| 2010/0259547 A1 | 10/2010 | de Aguiar et al. |
| 2010/0278405 A1 | 11/2010 | Kakadiaris et al. |
| 2010/0285877 A1 | 11/2010 | Corazza |
| 2011/0157306 A1 | 6/2011 | Lin et al. |
| 2011/0292034 A1 | 12/2011 | Corazza et al. |
| 2012/0019517 A1 | 1/2012 | Corazza et al. |
| 2012/0038628 A1 | 2/2012 | Corazza et al. |
| 2013/0021348 A1 | 1/2013 | Corazza et al. |
| 2013/0127853 A1 | 5/2013 | Corazza |
| 2013/0215113 A1 | 8/2013 | Corazza et al. |
| 2013/0235045 A1 | 9/2013 | Corazza et al. |
| 2014/0160116 A1 | 6/2014 | de Aguiar et al. |
| 2014/0204084 A1 | 7/2014 | Corazza et al. |
| 2014/0313192 A1 | 10/2014 | Corazza et al. |
| 2015/0145859 A1 | 5/2015 | Corazza et al. |

FOREIGN PATENT DOCUMENTS

| | | |
|---|---|---|
| WO | WO/09/007701 | 1/2009 |
| WO | WO/10/060113 | 5/2010 |
| WO | WO/10/129721 | 11/2010 |
| WO | WO/11/123802 | 10/2011 |
| WO | WO/12/012753 | 1/2012 |

OTHER PUBLICATIONS

U.S. Appl. No. 14/451,237, Jun. 24, 2016, Office Action.
Written Opinion of the International Searching Authority for InternationalApplication No. PCT/US09/57155, date completed Dec. 22, 2009, dated Jan. 12, 2010, 6 pgs.
U.S. Appl. No. 12/625,553, Nov. 17, 2013, Notice of Allowance.
U.S. Appl. No. 14/451,237, Mar. 9, 2016, Preinterview 1st OA.
U.S. Appl. No. 14/188,638, Jan. 20, 2016, Notice of Allowance.
Belkin et al.; Laplacian Eigenmaps for Dimensionality Reduction and Data Representation; Neural Computations 15, pp. 1373-1396; 2003.
U.S. Appl. No. 14/451,237, Sep. 29, 2016, Office Action.
U.S. Appl. No. 14/451,237, Feb. 27, 2017, Office Action.
U.S. Appl. No. 14/451,237, May 10, 2017, Office Action.
U.S. Appl. No. 14/451,237, Aug. 23, 2017, Office Action.
International Serach Report for International Application No. PCT/US09/65825, date completed Jan. 21, 2010, dated Jan. 28, 2010, 3 pgs.
Written Opinion of the International Searching Authority for International Application No. PCT/US09/65825, date completed Jan. 21, 2010, dated Jan. 28, 2010, 6 pgs.
International Search Report for International Application No. PCT/US/09157155, date completed Dec. 22, 2009, dated Jan. 12, 2010, 5 pgs.
Written Opinion of the International Searching Authority for InternationalApplication No. PCT/US09/57155, date completed Dec. 22, 2009, dated Jan. 12,2010, 6 pgs.
International Search Report for International Application PCT/US2011/045060, completed Nov. 27, 2011, 2 pgs.
Written Opinion for International Application PCT/US2011/045060, completed Nov. 27, 2011, 5 pgs.
International Search Report for PCT/US2010/033797, filed May 5, 2010, report completed Jun. 11, 2010, 2 pgs.
Written Opinion for PCT/US2010/033797, filed May 5, 2010, completed Jun. 11, 2010, 4 pgs.
Aguiar, E. de et al., "Automatic Conversion of Mesh Animations into Skeletonbased Animations", EUROGRAPHICS 2008, Apr. 2008, 9 pgs.
Anguelov et al., "Recovering Articulated Object Models from 3D Range Data", In Proceedings of the 20th Conference on Uncertainty in Artificial Intelligence, pp. 18-26.
Anguelov et al.,"SCAPE: Shape Completion and Animation of People", Proceedings of the SIGGRAPH Conference, pp. 408-416, 2005.
Anguelov et al., "The Correlated Correspondence Algorithm for Unsupervised Registration of Nonrigid Surfaces", In Conference on Computer Vision and Pattern Recognition (CVPR), 2005, pp. 77-84.

(56) References Cited

OTHER PUBLICATIONS

Baran et al., "Automatic rigging and animation of 3D characters", ACM Transactions on Graphics (TOG)—Proceedings of ACM SIGGRAPH 2007, vol. 26 Issue 3, Jul. 2007.
Beaudoin et al., "Adapting Wavelet Compression to Human Motion Capture Clips", GI '07 Proceedings of Graphics Interface, 2007, 6 pgs.
Blanz et al., "A Morphable Model for the Synthesis of 3D Faces", In Proceedings of ACM SIGGRAPH 1999, 8 pgs.
Blanz et al., "Reanimating Faces in Images and Video", Computer Graphics Forum, vol. 22, No. 3, Blackwell Publishing, Inc., 2003, 10 pgs.
Bray, Joseph, "Markless Based Human Motion Capture: A Survey", Published 2001, 44 pgs.
Buenaposada et al., "Performance Driven Facial Animation Using Illumination Independent Appearance-Based Tracking", In Proceedings of ICPR, Hong Kong, Aug. 2006, 4 pgs.
Cheung et al., "Shape-from Silhouette of Articulated Objects and its use for Human Body Kinematics Estimation and Motion Capture", In Conference on Computer Vision and Pattern Recognition (CVPR), pp. 77-84, 2003.
Curio et al., "Semantic 3D Motion Retargeting for Facial Animation", ACM 2006, 8 pgs.
Curless et al., "The Space of Human Body Shapes: Reconstruction and Parameterization form Range Scans", ACM Transactions on Graphics, 22(3), pp. 587-594, 2003.
Curless et al., "A Volumetric Method of Building Complex Models from Range Images", Proceedings of SIGGRAPH 1996, pp. 303-312, 1996.
Curless et al., "Articulated Body Deformation from Range Scan Data", ACM Transactions on Graphics, 21 (3), pp. 612-61 9, 2002.
Davis et al., "Filing Holes in Complex Surfaces Using Volumetric Diffusion", Symposium on 3 D Data Processing, Visualization, and Transmission, 11 pgs. 2002.
de Aguiar, et al., "Marker-Less 3D Feature Tracking for Mesh-Based Human Motion Caption", Human Motion 2007, LNCS 4818, 2007, pp. 1-15.
Di Bernardo et al., "Generating Realistic Human Motions from Observations", submitted to Fifth European Conf. on Computer Vision, ECCV 1998, pp. 1-12.
Garland et al., "Surface Simplification Using Quadric Error Metrics", Proceedings of SIGGRAPH 1997, pp. 209-216, 1997.
Gao et al., "Motion normalization: the preprocess of motion data", 2005, pp. 253-256.
Goncalves et al., Reach Out and Touch Space (Motion Learning), Automatic Face and Gesture Recognition, 1998. Proceedings. Third IEEE International Conference on Apr. 14-16, 1998, pp. 234-239.
Grassia, "Believable Automatically Synthesized Motion by Knowledge-Enhanced Motion Transformation", Thesis CMU-CS-00-163, Retrieved from http://citeseerx.ist.psu.edu/viewdoc.download?doi . . . Aug. 21, 2000, 220 pages.
Hahnel et al., "An Extension of the ICP Algorithm for Modeling Nonrigid Objects with Mobile Robots", Proceedings of the International Joint Conference on Artificial Intelligence (IJCAI), 6 pgs, 2003.
Hilton et al., "From 3D Shape Capture to Animated Models", First International Symposium on 3D Processing, Visualization and Transmission (3DVPT2002), pp. 246-255, 2002.
Ju et al., "Reusable Skinning Templates Using Cage-based Deformations", ACM Transactions on Graphics (TOG)—Proceedings of ACM SIGGRAPH Asia 2008, vol. 27 Issue 5, Dec. 2008, 10 pgs.
Kahler et al., "Head shop: Generating Animated Head Models with Anatomical Structure.", ACM SIGGRAPH Symposium on Computer Animation, pp. 55-64, 2002.
Lewis, "H.264/MPEG-4 AVC CABAC overview", http://www.theonlineoasis.co.uk.html, Dec. 3, 2012.
Lewis et al., "Pose Space Deformation: A Unified Approach to Shape Interpolation and Skeleton-Drive Deformation", Proceedings of ACM SIGGRAPH 2000, pp. 165-172, 2000.
Liepa, P., "Filing Holes in Meshes", Proc. of the Eurographics/ACM SIGGRAPH Symposium on Geometry Processing, pp. 8 pgs., 2003.
Liu, et al. "3D Motion Retrieval with Motion Index Tree", Computer Vision and Image Understanding, vol. 92, Issues 2-3, Nov.-Dec. 2003, pp. 265-284, Jun. 1, 2003.
Ma et al., "An Invitation to 3D Vision", Springer Verlag, pp. 15-28, 2004.
Mamou et al., "Temporal DCT-based compression of 3D dynamic meshes", ICCOM'06 Proceedings of the 10th WSEAS international conference on Communications, 2006, 74-79.
Mamou et al., "The New MPEG-4/FAMC Standard for Animated 3D Mesh Compression", IEEE 3DTV-CON'08, May 2008.
Max Planck Institut Informatik, "Automatic Conversion of Mesh Animations into Skeleton-based Animations", http://www.mpiinf.mpg.de/~edeaguia/animation_eg08.html; Mar. 30, 2008, 9 pgs.
Mohr et al., "Building Efficient, Accurate Character Skins from Examples", ACM Transactions on Graphics, 22(3), 562-568, 2003.
Noh et al., "Expression Cloning", Proceedings of ACM SIGGRAPH 2001, pp. 277-288, 2001.
Okada, R. et al., "A Video Motion Capture System for InteractiveGames.", MVA2007 IAPR Conference on MachineVisionApplications, Tokyo, Japan Retrieved from: http://scholar.google.com/scholar?hl=en&ir=&c1tes=1829 . . . Retrieved on Jun. 11, 2010, May 16-18, 2007.
Park et al., "On-line locomotion generation based on motion blending", ACM SIGGRAPH Symposium on Computer Animation. San Antonio, Jul. 21, 2002, pp. 105-111.
Park et al., "On-line motion blending for real-time locomotion generation", Computer Animation & Virtual Worlds Wiley, UK vol. 15, No. 3-4, Jul. 2004, pp. 125-138.
Popovic et al.,"Style-Based Inverse Kinematics", ACM Transactions in Graphics, 23(3), 522-531, 2004.
Safonova, et al., "Construction and optimal search of interpolated motion graphs", ACM SIGGRAPH, 2007, 11 pgs.
Sand et al., "Continuous Capture of Skin Deformation", ACM Transactions on Graphics, 22(3), pp. 578-586, 2003.
Scholkopf et al., "A Tutorial on support Vector Regression", In Technical Report NC2-TR-1998-030. NeuroCOLT2, 1998.
Seo et al., "An Automatic Modeling of Human Bodies from Sizing Paramaters", In Symposium on Interactive 3D Graphics, pp. 19-26.
Seitz et al. "A Comparison and Evaluation of Multi-View Stereo Reconstruction Algorithms", Computer Vision and Pattern Recognition, 2006 IEEE Computer Society Conference on, vol. 1, IEEE, 2006, 8 pgs.
Sloan et al., "Shape by Example", In 2001 Symposium on Interactive 3D Graphics, pp. 135-144, 2001.
Smola et al., "A Tutorial on Support Vector Regression", Statistics and Computing London 14(3) pp. 199-222, 2004.
Sumner et al., "Deformation Transfer for Triangle Meshes", Proceedings of ACM SIGGRAPH 2004, 23(3), pp. 399-405, 2004.
Szliski et al., "Matching 3D Anatomical Surfaces with Non-rigid Deformations Using Octree-splines", International Journal of Computer Vision, 18(2), pp. 171-186, 1996.
Tao et al., "Mean Value Coordinates for Closed Triangular Meshes", Proceedings of ACM SIGGRAPH 2005, 6 pgs.
Taylor et al., "Modeling Human Motion Using Binary Latent Variables", Proc. of Advances in Neural Information Processing Systems (NIPS) 19, 8 pgs.
Tung et al., "Topology Matching for 3D Video Compression Computer Vision and Pattern Recognition", IEEE Conference Computer Vision and Pattern Recognition, 2007, Jun. 2007.
Vasilescu et al., "Multilinear Analysis of Image Ensembles: Tensorfaces", European Conference on Computer Vision (ECCV), pp. 447-460, May 2002.
Vlasic et al., "Face Transfer with Multilinear Models", ACM Transactions on Graphics 24(3), pp. 426-433, 2005.
Vlasic et al., "Multilinear Models for Facial Synthesis", SIGGRAPH Research Sketch, 1 pg., 2004.
Von Luxburg, "A Tutorial on Spectral Clustering. Statistics and Computing", 2007, 32 pgs.

(56) References Cited

OTHER PUBLICATIONS

Wang et al., "Multi-weight Enveloping: Least Squares Approximation Techniques for Skin Animation", ACM SIGGRAPH Symposium on Computer Animation, pp. 129-138, 2002.
Weise, et al., "Realtime performance-based facial animation", ACM Transactions on Graphics (TOG) 30.4 (2011): 77., 2011, 9 pages.
Wikipedia, "Morph target animation", Last Modified Aug. 1, 2014, Printed Jan. 16, 2015, 3 pages.
Zhidong, et al., "Control of motion in character animation", Jul. 14, 2004, pp. 841-848.
Zordan, et al., "Dynamic Response for Motion Capture Animation", ACM Transactions on Graphics-Proceedings of ACM SIGGRAPH 2005, vol. 24, Issue 3, Jul. 2005, pp. 697-701.
U.S. Appl. No. 12/625,553, Sep. 28, 2010, Office Action.
U.S. Appl. No. 12/625,553, Apr. 16, 2013, Notice of Allowance.
U.S. Appl. No. 12/625,553, Nov. 27, 2013, Notice of Allowance.
U.S. Appl. No. 13/038,185, Jul. 9, 2013, Office Action.
U.S. Appl. No. 13/038,185, Mar. 31, 2014, Notice of Allowance.
U.S. Appl. No. 13/071,764, Feb. 14, 2014, Office Action.
U.S. Appl. No. 13/071,764, Jun. 2, 2014, Office Action.
U.S. Appl. No. 13/071,764, Nov. 7, 2014, Notice of Allowance.
U.S. Appl. No. 14/188,638, Aug. 5, 2015, Office Action.
U.S. Appl. No. 14/188,638, Dec. 4, 2015, Notice of Allowance.

* cited by examiner

REAL TIME CONCURRENT DESIGN OF SHAPE, TEXTURE, AND MOTION FOR 3D CHARACTER ANIMATION

CROSS-REFERENCE TO RELATED APPLICATIONS

This application is a continuation of U.S. patent application Ser. No. 13/071,764 filed Mar. 25, 2011, which claims priority to U.S. Provisional Application No. 61/317,653 filed Mar. 25, 2010 and is a Continuation-in-Part of U.S. patent application Ser. No. 12/625,553, filed Nov. 24, 2009, which itself claims priority to U.S. Provisional Application No. 61/200,212 filed Nov. 24, 2008 and as a Continuation-in-Part of U.S. patent application Ser. No. 12/584,117 filed Aug. 31, 2009, the disclosures of which are incorporated herein by reference in their entirety.

FIELD OF THE INVENTION

The present invention relates generally to computer generated graphics, and more specifically to the real time generation of 3D characters for use in animation.

BACKGROUND

The use of 3D content and in particular of animated 3D characters is becoming increasingly popular. In animated movies, games and virtual worlds, 3D character models or avatars are often one of the most essential and compelling aspects of the experience. Despite the increased demand for animated 3D characters, 3D character models for use in animation continue to be created by artists with specialized training. The artist typically creates a 3D character animation by manually producing a 3D characters model and motion data that animates the 3D model. A common process for generating 3D character animations is illustrated in FIG. 1. The process 100 involves creating (102) a mesh of the 3D character. A mesh is a collection of vertices and polygons that define the shape of an object in 3D. A texture is created (104) and is applied (106) to the mesh. The texture defines the appearance of the mesh. In order to enable the animation of the 3D character, a skeleton is created (108) and skinning weights (110) are defined. The skeleton defines the articulated body parts of the mesh and the skinning weights define the deformation of the mesh as a function of the motion of the skeleton. The process of defining a skeleton and skinning weights is often referred to as rigging the 3D character. The rigging of a 3D character is usually quite complex and time-consuming, and requires specific 3D modeling knowledge/education. This represents a barrier to the generation of 3D animation content from a wider audience. Moreover, most 3D modeling tools require the installation of 3$^{rd}$ party software, which represents a further barrier to widespread use and diffusion of 3D animation related art.

SUMMARY

Systems and methods in accordance with embodiments of the invention are capable of automatically generating animation-ready 3D character models. In many embodiments, animation-ready 3D character models are generated in real time based upon a description of a desired 3D character provided via a web based user interface. In several embodiments, animation-ready 3D character models are generated by animators for use in animations. In other embodiments, animation-ready 3D character models are generated in interactive environments such as video games and are used to generate animations within the game.

One embodiment of the invention includes an application server configured to receive the user defined model parameters and the at least one texture selection via a user interface. In addition, the application server includes a generative model and the application server is configured to generate a 3D mesh based upon the user defined model parameters using the generative model and to apply texture to the generated mesh based upon the at least one texture selection.

In a further embodiment, the application server is further configured to receive a user clothing selection, the application server includes at least one clothing mesh template including a clothing mesh, a template skeleton, and skinning weights and the application server is configured to apply the clothing mesh from the clothing mesh template corresponding to the user clothing selection to an anatomical mesh generated based upon the user defined model parameters using the generative model to create a clothed mesh, the clothing mesh model includes UV mappings used to map texture to the clothing mesh model, the application server is configured to adjust the template skeleton of the clothing mesh template corresponding to the user clothing selection based upon the shape of the clothed mesh, the application server is configured to generate skinning weights based upon the skinning weights of the clothing mesh template corresponding to the user clothing selection, the application server is configured to apply modified textures to the clothed mesh utilizing the UV mappings and the at least one texture selection, and the application server stores an animation-ready 3D character model including the clothed mesh, the adjusted skeleton, and the generated skinning weights.

In another embodiment, the clothed mesh has polygon correspondence with the clothing mesh template corresponding to the user clothing selection.

In a still further embodiment, the generated skinning weights are the same as the skinning weights of the clothing mesh template corresponding to the user clothing selection.

In still another embodiment, the user interface is a web based user interface generated by the application server.

In a yet further embodiment, the application server is configured to generate the animation-ready 3D character model in real time in response to receipt of the user defined model parameters, the at least one texture selection, and the clothing selection via the web based user interface.

In yet another embodiment, the generative model is produced by principal component analysis of a data set of 3D meshes, the application server is configured to transform the user defined model parameters in terms of the principal components of the generative model, and the 3D anatomical mesh is generated using the transformed user defined model parameters and the generative model.

In a further embodiment again, the application server is configured to apply the clothing mesh template to the 3D anatomical mesh using a Mean Value Coordinates calculation that deforms the vertices of the clothing mesh template in response to the location of the vertices of the 3D anatomical mesh.

In another embodiment again, the application server is configured to apply a blend shape process to correct artifacts in the clothed mesh introduced by the Mean Value Coordinates calculation.

In a further additional embodiment, the application server is configured to adjust the template skeleton based upon the deformation of the clothing mesh template using a Mean Value Coordinates calculation.

In a still yet further embodiment, the application server is configured to apply the clothing mesh template to the 3D anatomical mesh by morphing the clothing mesh template into the 3D anatomical mesh using a non-rigid mesh registration process.

In still yet another embodiment, the application server is configured to use masks to separate the texture of the clothed mesh into regions.

In a still further embodiment again, the color components of each texture region are represented in the Hue, Saturation, and Value color space.

In still another embodiment again, the application server is configured to adjust the Hue of a texture region in response to the at least one texture selection.

In a still further additional embodiment, the application server is configured to adjust the Saturation and Value components of a texture region relative to initial values in response to the at least one texture selection.

An embodiment of the method of the invention includes receiving model parameters and a clothing selection via a user interface generated by an application server, automatically generating a 3D anatomical mesh based upon the received model parameters using the application server, automatically applying a clothing mesh template based upon the clothing selection to the generated 3D anatomical model to produce a clothed mesh using the application server, automatically rigging the clothed mesh by adjusting the template skeleton and generating skinning weights based upon the skinning weight of the clothing mesh template using the application server, receiving at least one texture selection via a user interface generated by the application server, and modifying a texture region of the clothed mesh in response to the at least one texture selection using the application server.

A further embodiment of the method of the invention further includes mapping the model parameters to principal components of a generative model using the application server, where the generative model is created by principal component analysis of a data set of 3D meshes, and generating a 3D anatomical mesh based upon the mapped model parameters and the generative model using the application server.

A still further embodiment of the method of the invention further includes applying a clothing mesh template based upon the clothing selection to the generated 3D anatomical model to produce a clothed mesh further comprises using a Mean Value Coordinates calculation that deform the vertices of the clothing mesh template in response to the location of the vertices of the 3D anatomical mesh.

Still another embodiment of the method of the invention further includes applying a blend shape process to correct artifacts in the clothed mesh introduced by the Mean Value Coordinates calculation using the application server.

In a yet further embodiment of the method of the invention, adjusting the template skeleton further includes adjusting the joints of the skeleton based upon the deformation of the clothing mesh template using a Mean Value Coordinates calculation performed by the application server.

In yet another embodiment of the method of the invention, applying a clothing mesh template based upon the clothing selection to the generated 3D anatomical model to produce a clothed mesh further includes applying the clothing mesh template to the 3D anatomical mesh by morphing the clothing mesh template into the 3D anatomical mesh using a non-rigid mesh registration process.

In a further embodiment again of the method of the invention, the clothed mesh has polygon correspondence with the clothing mesh template selected by the user.

In another embodiment again of the method of the invention, the generated skinning weights are the same as the skinning weights of the clothing mesh template.

A further additional embodiment of the method of the invention also includes modifying the texture of the clothed mesh by applying textures using UV mappings that were used to map texture to the clothing mesh model using the application server.

In another additional embodiment of the method of the invention, the texture of the clothed mesh is separated into regions by masks.

In a still yet further embodiment of the invention, the color components of each texture region are represented in the Hue, Saturation, and Value color space.

Still yet another embodiment of the invention also includes adjusting the Hue of a texture region in response to the at least one texture selection using the application server.

A still further embodiment again, also includes adjusting the Saturation and Value components of a texture region relative to initial values in response to the at least one texture selection using the application server.

DETAILED DESCRIPTION

Figure 1:
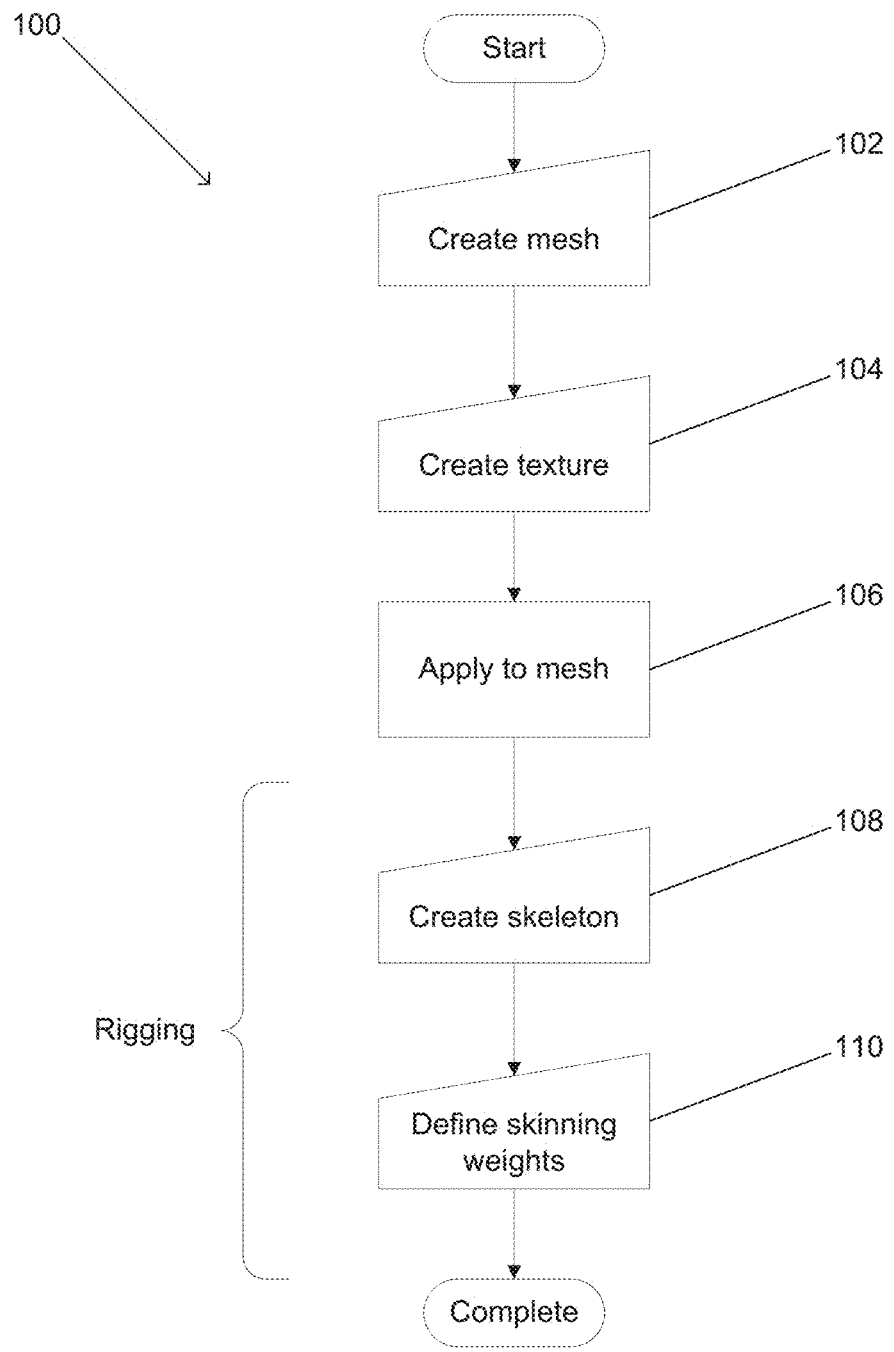
FIG. 1 is a flow chart illustrating a common process for generating 3D character animations.

Turning now to the drawings, systems and methods for generating animation-ready 3D character models in accordance with embodiments of the invention are illustrated. An animation-ready 3D character model is typically considered to be a 3D character model for which a mesh, a skeleton, and skinning weights are defined. The skeleton and the skinning weights define the deformation of the mesh during articulation of the body parts of the 3D character. Therefore, the combination of the mesh, skeleton, and skinning weights is sufficient to enable the animation of the 3D character. In many embodiments, an animation-ready 3D character model is generated in response to a description of the desired characteristics of the 3D character using a generative model. In a number of embodiments, the generative model is used to generate a 3D anatomical mesh. The 3D anatomical mesh defines the body of the character. Each 3D anatomical mesh generated by the generative model possesses polygon correspondence with a number of clothing mesh templates, which can be applied to the generated 3D mesh. A clothing mesh template is template that is typically created by an animator, in which a clothing mesh is applied to a 3D anatomical mesh and the mesh is rigged with a skeleton and skinning weights. A user can select a clothing mesh template to apply to the generated 3D anatomical mesh. The clothing mesh template includes a template skeleton, which can be automatically adjusted according to the generated 3D anatomical mesh to which the clothing mesh is applied. When a clothing mesh is applied to a 3D anatomical mesh, the result is often referred to as a clothed mesh. Due to the polygon correspondence between the clothing template mesh and the generated 3D anatomical mesh, the same UV mappings used to apply texture to the clothing mesh template can be used to map textures to the clothed mesh. Therefore, the user can modify the texture of the clothed mesh in real time. In many embodiments, a user interface is provided enabling the color and/or pattern of the clothing of the mesh template to be edited in real time. A similar user interface can be used to edit the 3D anatomical mesh and/or a clothed mesh.

The clothing mesh template also includes skinning weights, which can be directly applied to rig the 3D character model due to the polygon correspondence between the generated 3D anatomical mesh and the clothing mesh template. The application of the clothing mesh template to the generated 3D mesh typically involves using the 3D mesh to "drive" the deformation of the clothing mesh used to create the clothed mesh. In instances where the generated 3D anatomical mesh extrapolates from a training data set, the process of deforming the clothing mesh template based upon the generated 3D anatomical mesh can result in artifacts at intersections of body parts of the 3D character. Therefore, many embodiments apply a process to correct artifacts introduced by application of the clothing mesh template to generated 3D meshes that extrapolate from the training data set used to generate the 3D mesh.

In several embodiments, a generative model for 3D characters is created using unsupervised learning or supervised learning. In both cases the learning is achieved using a set of example 3D meshes that can involve labeled data. The generative model enables the generation of new 3D meshes that interpolate or extrapolate the space defined by the example 3D meshes. The labels are used by the generative model to express the space of 3D meshes in terms of meaningful parameters that describe the anatomical characteristics of a specific 3D mesh. For example, the model parameters can include but are not limited to height, weight, and/or attractiveness.

In many instances, a user interface is provided that enables a user to automatically create, view, and animate a 3D character model in real time. Systems and methods for generating animation-ready 3D characters in accordance with embodiments of the invention are discussed further below.

Systems for Generating an Animation-Ready 3D Character Model

Figure 2:
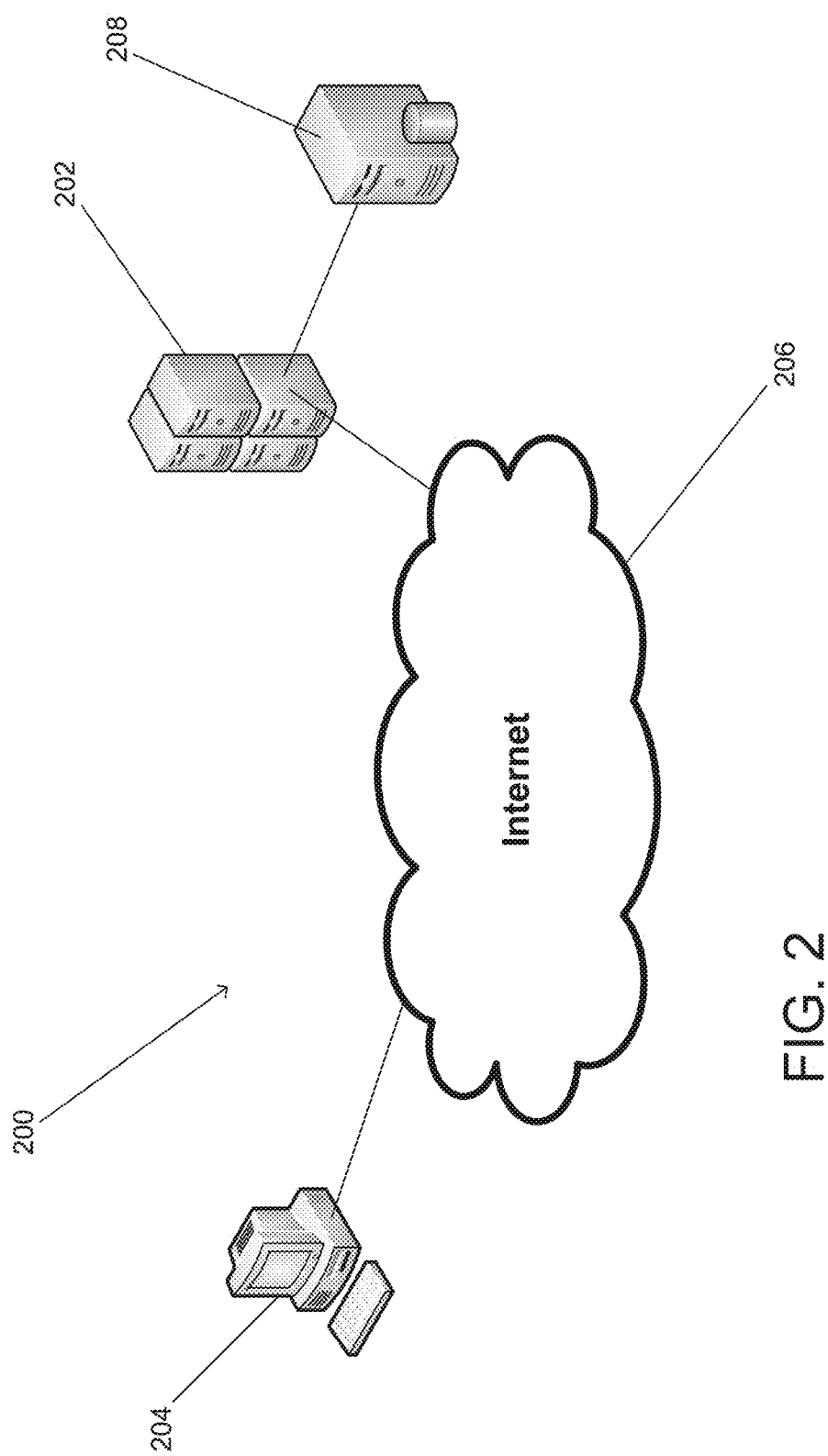
FIG. 2 is a network diagram illustrating a system for automatically generating animation-ready 3D characters based upon parameters received from a user via the Internet in accordance with an embodiment of the invention.

A system for generating an animation-ready 3D character model in accordance with the embodiment of the invention is illustrated in FIG. 2. The system 200 includes an application server 202 that is configured to communicate with a client device 204 via a network such as the Internet 206. The application server is typically configured to provide a user interface to the client device via which a user is able to specify characteristics of a 3D character. The application server includes a generative model. In many embodiments, the application server uses the description provided via the client device to create a 3D anatomical mesh. The application server can also include a number of clothing mesh templates. The clothing mesh templates typically include a clothing mesh constrained to have polygon correspondence with the 3D anatomical meshes generated by the generative model, a template skeleton, and a set of skinning weights. In several embodiments, the user can specify clothing to apply to the 3D character and the appropriate clothing mesh is applied to the generated 3D anatomical mesh. The application server adjusts the template skeleton for the clothing mesh template in accordance with the shape of the 3D mesh created by the application of the clothing mesh to the 3D anatomical mesh. The application server can then apply the skinning weights from the clothing mesh template to rig the generated 3D character model. During the generation of the animation-ready 3D character model, artifacts can occur at complex vertices of the 3D mesh and the application server is configured to correct these artifacts. In the illustrated embodiment, the generative model used to produce the 3D anatomical mesh is created using a database of character shapes 208. Any of a variety of processes can be used in the creation of a generative model including supervised learning in which each of the example 3D meshes in a database is labeled and a process such as the process described in U.S. patent application Ser. No. 11/881,172 entitled "Shape Completion, Animation and Marker-less Motion Capture of People, Animals or Characters" to Anguelov et al., filed Jul. 25, 2007, the disclosure of which is incorporated by reference in its entirety, is used to build a model describing the space of anatomical shapes for a particular type of 3D character. The process described by Anguelov et al. involves modeling the deformations between the shape of each example 3D mesh as a linear model. Although other processes can be utilized, the process described by Anguelov et al. includes the advantage that all 3D anatomical meshes generated by the model possess polygon correspondence. Polygon correspondence refers to the fact that each 3D mesh includes the same number of polygons and that each polygon has a corresponding polygon in all of the 3D meshes. As is discussed further below, generating 3D anatomical meshes that have polygon correspondence can provide a number of benefits during the application of a clothing mesh and/or during the application of skinning weights to complete the rigging of the generated 3D character model. Processes for building a generative model and the use of a generative model in the automatic generation of animation-ready 3D character models in accordance with embodiments of the invention are discussed further below.

The generation of a 3D character by a system in accordance with an embodiment of the invention can be performed iteratively in real time and in a variety of contexts. For example, an animation-ready 3D character model can be generated by an animator using a web based user interface provided by the application server and the animation-ready 3D character model can be downloaded to a client device for animation. In many instances, the client device can also specify motions to animate the generated 3D character model and download both the 3D character model and the motion data used to animate the 3D character model. The animator could specify the motion data manually or generate the motion data automatically using a process such as one of the processes described in accordance with the process described in U.S. patent application Ser. No. 12/370,269 entitled "Interactive Design, Synthesis and Delivery of 3D Character Motion Data Through the Web", to Taylor et al., filed Feb. 2, 2009 the disclosure of which is incorporated by reference herein in its entirety. Another context in which an animation-ready 3D character model in accordance with an embodiment of the invention can be generated in real time is the creation of a 3D character or avatar by a user for use in a 3D interactive application such as a video game. An application server in accordance with an embodiment of the invention can enable a user to specify the characteristics and clothing of a 3D character and the generated 3D character model can be animated within the 3D video game. Systems and methods in accordance with embodiments of the invention can also be utilized to generate animation-ready 3D character models or animated 3D characters in a variety of contexts including but not limited to those outlined above and contexts in which the generation is performed, offline on a local workstation, and/or in a non-real time environment.

Generating a 3D Character

Figure 3:
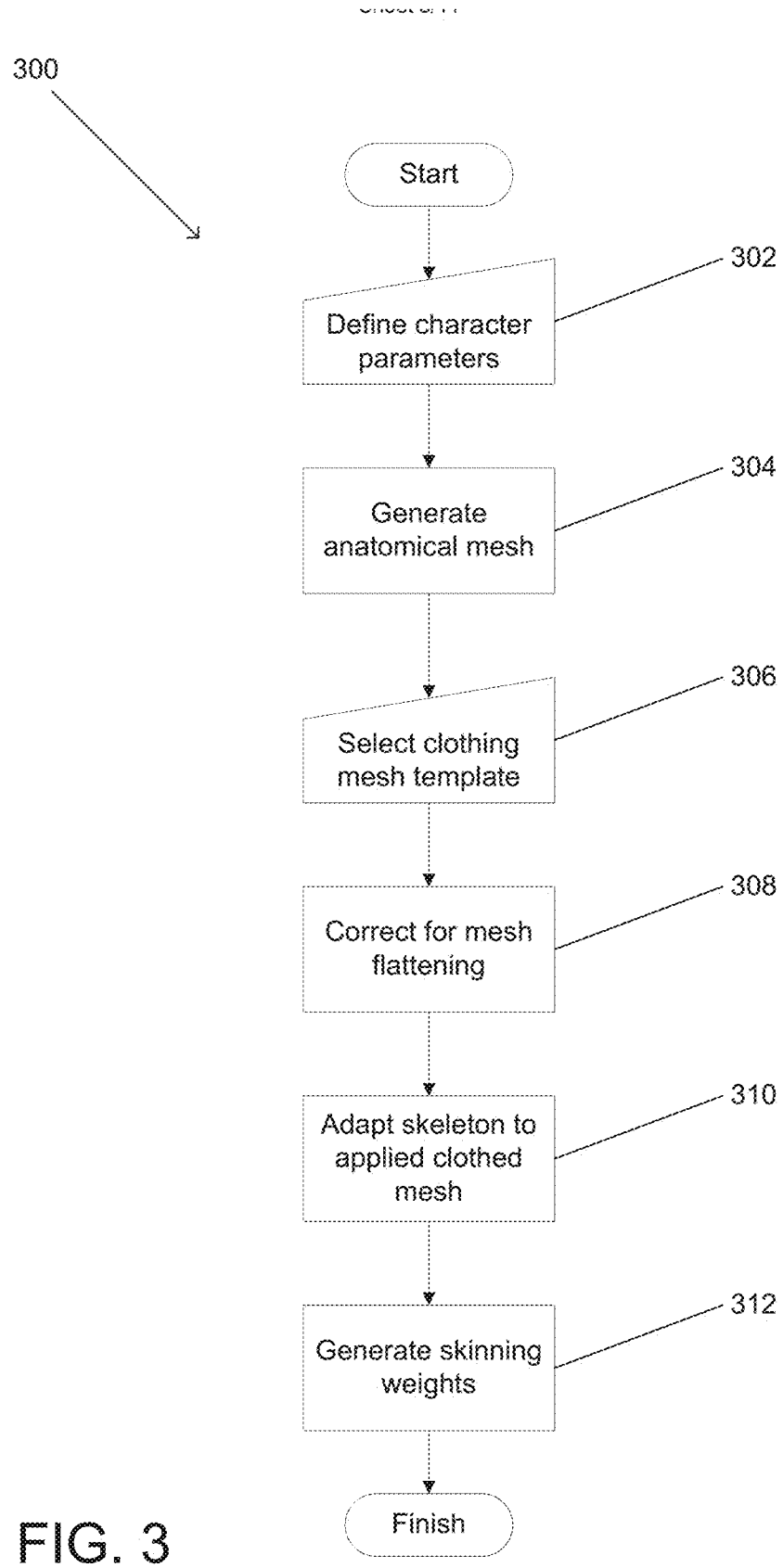
FIG. 3 is a flow chart illustrating a process for generating animation-ready 3D characters in accordance with an embodiment of the invention.

A process for generating an animation-ready 3D character model in accordance with an embodiment of the invention is illustrated in FIG. 3. The process 300 commences when a user provides (302) a definition of a desired 3D character. The definition is typically provided using a series of model parameters, where each model parameter describes a particular anatomical characteristic of the 3D character. Examples of model parameters include, but are not limited to, height, weight, musculature, and attractiveness. The description of the 3D character is used to automatically generate (304) a 3D anatomical mesh using a generative model. The automatic generation of a 3D anatomical mesh is discussed further below. The user can also specify clothing for the character. Typically the clothing is selected (306) from one of a number of options, where each option corresponds to a clothing mesh template. In many instances, artifacts can occur at complex vertices when a clothing mesh is applied to the generated 3D anatomical mesh. Therefore, a process can be applied to correct (308) for introduced artifacts in the clothed mesh of the 3D character. Processes for correcting for introduced artifacts are discussed further below. Once a clothed mesh has been generated by the application of a clothing mesh to a generated 3D anatomical mesh, the template skeleton of the clothing mesh model is automatically modified (310) based upon the shape of the clothed mesh. The rigging of the clothed mesh is then completed by automatically generating skinning weights (312) for the clothed mesh. In a number of embodiments, polygon correspondence between the clothed mesh and the clothing mesh template enables the clothed mesh to be rigged by simply applying the same skinning weights from the clothing mesh template to the clothed mesh of the 3D character. The automatic rigging of animation-ready 3D character models is also discussed further below.

As can be readily appreciated from a comparison of the processes illustrated in FIGS. 1 and 3, the process 300 illustrated in FIG. 3 requires considerably less specialized knowledge in order to generate an animation-ready 3D character model. A user need simply describe the 3D character using a simple user interface and select clothing from a number of clothing options. The generation of the mesh, skeleton and skinning weights for the 3D character model is entirely automated. In the event that the user is unsatisfied with the appearance of the 3D character, the user can modify the description of the character and automatically regenerate the 3D character until satisfied. In many embodiments, the computation complexity of generating an animation-ready 3D character model is sufficiently economical that the 3D character model can be generated in real time. Although a specific process is illustrated in FIG. 3 for generating an animation-ready 3D character model, any of a variety of other processes involving a user specifying the characteristics and clothing of a 3D character and then automatically generating a 3D anatomical mesh to which clothing meshes can be applied can be utilized in accordance with embodiments of the invention.

Creation of a Generative Model

The process illustrated in FIG. 3 assumes the presence of a generative model that can be used to generate a 3D anatomical mesh for a 3D character based upon characteristics specified by a user. A generative model can be constructed using a machine learning technology similar to the machine learning technology described in U.S. patent application Ser. No. 11/881,172, incorporated by reference above, and further described by Anguelov et al., "SCAPE: Shape Completion and Animation of People" Proceedings of SIGGRAPH Conference (2005), the disclosure of which is also incorporated by reference herein in its entirety. In many embodiments, Principal Component Analysis (PCA) is used to learn a generative model for a particular type of 3D character. For example, separate generative models can be created for men, women, boys, girls, and/or different species of animal. PCA is a mathematical procedure that transforms a number of possibly correlated variables into a smaller number of uncorrelated variables called principal components.

A data set of 3D anatomical meshes can be derived from range scans of real individuals, animals, or sculptures, or from synthetic data. To perform PCA, the 3D anatomical meshes in the data set are registered and placed in correspondence with one of the meshes, which is selected as a template mesh, and a single generative or morphable model is created by computing point to point correspondences between the template mesh and the remaining 3D anatomical meshes in the data set. In several embodiments, PCA is applied to vertex positions as described by Blanz et al. "A morphable model for the synthesis of 3D faces", Proceedings of ACM SIGGRAPH (1999), the disclosure of which is incorporated by reference herein in its entirety. In a number of embodiments, PCA is applied to determine the correspondence between the polygons of the template mesh and the other 3D anatomical meshes in the data set as described by Anguelov et al. in the paper incorporated by reference above. An advantage of using PCA based upon polygon correspondence is that all 3D anatomical meshes generated by the anatomical model possess polygon correspondence, which can simplify the processes associated with applying clothing meshes to the generated 3D anatomical mesh, and applying skinning weights to rig the clothed mesh. In other embodiments, PCA can be applied to any of a variety of different manually or automatically identified correspondence characteristics. Alternatively, processes other than PCA can be utilized to create a generative model capable of generating 3D anatomical meshes for a 3D character type.

Re-Parameterization of Principal Components

Once the principal components for the 3D character type are identified using PCA of the data set, anatomical meshes for 3D characters can be generated based upon a specification of principal components. In order to have a meaningful interaction with the principal components that define the shape of the 3D mesh of a character type's anatomy, the principal components can be re-parameterized in terms of concepts that are meaningful when describing the anatomical shape of a 3D character. For example, the principal components can be projected onto the axis of a multi-dimensional space describing anatomical shape such as, but not limited to, weight, height, muscularity, and attractiveness. Re-parameterization can leverage both automatic and manual labeling of the 3D anatomical mesh data set by enabling each principal component or groups of principal components to be expressed as a function of a set of labels. In many embodiments, these functions are automatically learned based upon the relationship between the labels vector and the PCA components of each 3D anatomical mesh in the training data set. In several embodiments, the functions are constrained to be linear and a learning process similar to the process described by Allen et al., "The space of human body shapes: reconstruction and parameterization from range scans", ACM Transactions on Graphics 22, 3 (2003), 587-594, the disclosure of which is incorporated by reference herein in its entirety, is utilized. In a number of embodiments, a layer of non-linear transformation can be applied between the principal components and the labels provided to the user. For example, body mass index can be a function of the semantic components height and weight. In other embodiments, any of a number of different functions and/or learning processes can be utilized to re-parameterize the principal components in accordance with the requirements of a specific application.

A re-parameterized generative model in accordance with embodiments of the invention enables the generation of a 3D anatomical mesh by specification of a few simple parameters corresponding to well known anatomical characteristics. The parameters used to describe the anatomical characteristics can be referred to as model parameters. Not only does the generative model enable generation of 3D anatomical meshes similar to the 3D meshes observed in the example data set, but the generative model can also generate new 3D anatomical meshes derived from the example 3D anatomical meshes, and having model parameters inside the observed range of the principal components (interpolation). In addition, the generative model can generate new 3D anatomical models derived from the observed data, and having model parameters that our outside the observed range of the principal components (extrapolation).

Figure 4:
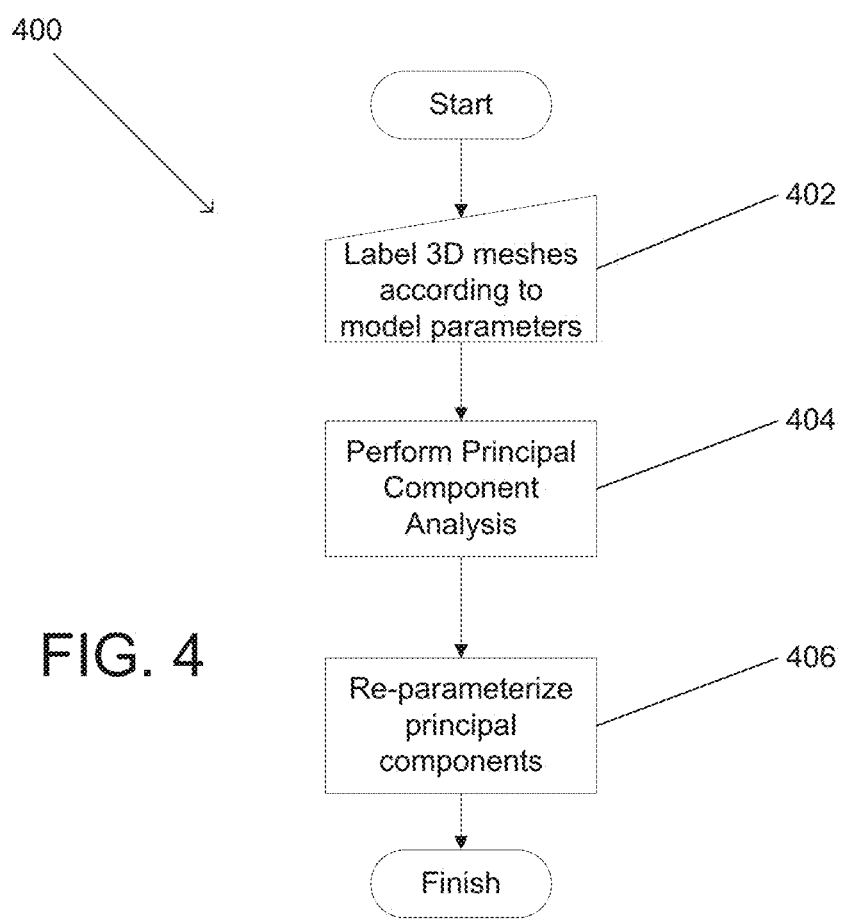
FIG. 4 is a flow chart illustrating a process for using Principal Component Analysis to create a generative model capable of generating 3D anatomical meshes based upon model parameters that define readily identifiable anatomical characteristics in accordance with an embodiment of the invention.

A process for creating a generative model capable of generating a 3D anatomical mesh for a specified 3D character type in accordance with an embodiment of the invention is illustrated in FIG. 4. The process 400 includes labeling (402) example 3D anatomical meshes, performing principal component analysis (404) on the example 3D anatomical meshes, and automatically re-parameterizing (406) the principal components of the generative model in terms of model parameters. The result is a generative model defined by the principal components and a set of functions that map model parameters to the principal components. Although a specific process is illustrated in FIG. 4, alternative processes satisfying the requirements of specific applications can be utilized to create a generative model capable of generating 3D anatomical meshes based upon model parameters in accordance with embodiments of the invention.

Application of a Clothing Mesh

Once a generative model is obtained, a 3D anatomical mesh for the particular 3D character type can be created by simply specifying desired model parameters for a 3D character that is sought to be generated. The generated 3D anatomical mesh can be used to drive different clothing mesh templates that can be used to customize the appearance of the generated 3D character. In many embodiments, the clothing mesh templates are designed by an animator and, as is discussed further below, include a template skeleton and skinning weights. In a number of embodiments, the generative model is created in such a way that all 3D anatomical meshes generated by it include the same number of corresponding polygons. As a result, the UV mapping for the texture of the clothing mesh template does not vary based upon the shape of the generated 3D anatomical model and the clothing mesh template can be applied to all 3D anatomical models generated by the generative model. In this way aspects of the appearance of the clothing including but not limited to the color and pattern of the clothing can be interactively edited in real time with the new textures simply being applied using the same UV mappings defined for the clothing mesh template. The real time editing of the texture of 3D anatomical meshes and clothed meshes in accordance with embodiments of the invention is discussed further below.

Figure 5:
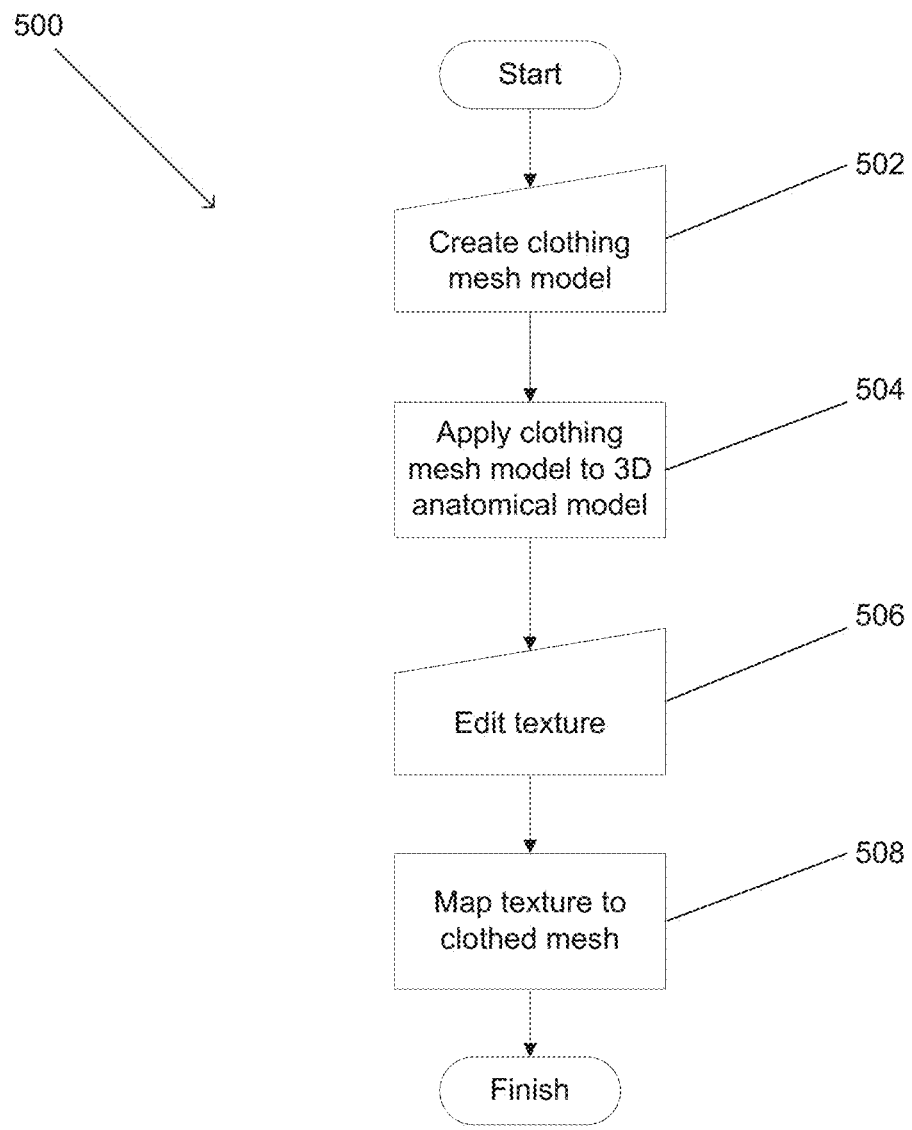
FIG. 5 is a flow chart illustrating a process for applying a clothing mesh template to a 3D anatomical mesh in accordance with an embodiment of the invention.

A process for applying a clothing mesh template to a generated 3D anatomical model in accordance with an embodiment of the invention is illustrated in FIG. 5. The process 500 includes creating (502) a clothing mesh template. The clothing mesh template is typically manually created. There are different possible processes for applying (504) a clothing mesh template to a 3D anatomical mesh. In several embodiments, a generative model is used to generate a 3D anatomical mesh, which an animator then uses as the basis for creating and rigging a clothing mesh template in a way that preserves mesh registration. The clothing mesh template has polygon correspondence with the 3D anatomical meshes generated by the generative model and as a result the Mean Value Coordinates algorithm can be utilized to "drive" the deformation of the clothing mesh template using a generated 3D anatomical mesh. The Mean Value Coordinates algorithm is generally defined by Tao et al. "Mean Value Coordinates for Closed Triangular Meshes", Proceedings of ACM SIGGRAPH (2005), the disclosure of which is incorporated by reference herein in its entirety. The clothed mesh template deformation is driven by the 3D anatomical mesh in the following way:

i) for each vertex "i" of the clothed mesh template, the mean value weight (a vector Wi that express the position of vertex "i" as a weighted average of the vertices of the 3D anatomical mesh) is computed;

ii) a matrix W is obtained that gives the position of the clothed mesh template vertices as functions of the position of the vertices of the 3D anatomical mesh;

iii) applying the positions of the vertices of a specific generated 3D anatomical mesh to the matrix W can provide the deformed vertices of the clothing mesh template, creating what is referred to as a clothed template.

As an extension, several embodiments of the invention utilize the following additional steps to express the position of the clothing mesh vertices as a function of the model parameters used to generate 3D anatomical meshes:

iv) static shape learning and semantic projection operations can be performed to output a matrix V that encodes the linear relationship between the model parameters used to generate the 3D anatomical mesh and the 3D anatomical mesh vertices; and v) a matrix M=W*V is calculated that provides the clothed mesh template vertex positions as functions of the model parameters.

Although specific processes are presented above for deforming a clothing mesh template, other processes in accordance with embodiments of the invention can be utilized to deform clothing mesh templates in response to model parameters specified by a user. For example, in many embodiments a pre-existing clothing mesh template is created and morphed into the shape of a generated 3D anatomical mesh by virtue of a non-rigid mesh registration process such as the process described in U.S. patent application Ser. No. 12/156,132 to Corazza et al. entitled "Automatic Generation of Human Models for Motion Capture, Biomechanics, and Animation", and filed May 29, 2008, the disclosure of which is incorporated herein by reference in its entirety. Accordingly, any of a variety of processes can be utilized to apply a clothing mesh template to a 3D anatomical mesh in accordance with an embodiment of the invention including processes that involve deformation of the clothing mesh template and/or processes that involve morphing of the clothing mesh template.

In many embodiments, the texture of the applied clothing mesh template can be interactively edited (506) as can the texture of the 3D anatomical mesh and/or the clothed mesh until a desired appearance is achieved. For example, the texture of the clothed mesh can be customized by using an input received via a user interface such as a common HSV color representation to map a new color texture to the clothed mesh. In many embodiments, the mapping (508) of textures to the clothed mesh is simplified by enforcing polygon correspondence between the clothing mesh template and the 3D anatomical mesh used to create the clothed mesh. The polygon correspondence between the clothing mesh template and the clothed mesh means that texture can be automatically applied to the clothed mesh using the same UV mappings as were used to apply texture to the clothing mesh model. In this way, new textures can be applied to the clothed mesh in real time interactive manner.

The temporal dynamic behavior of the moving clothes can be incorporated into the animation of the 3D character by coupling the kinematics of the clothing mesh template to those of the 3D anatomical mesh after a proper rigging is performed. However, prior to the rigging of a clothed mesh, a number of artifacts that can result from the generation of a 3D character and the application of a clothing mesh template may be corrected.

Correction of Artifacts in Models Outside Training Data Range

Figure 6A:
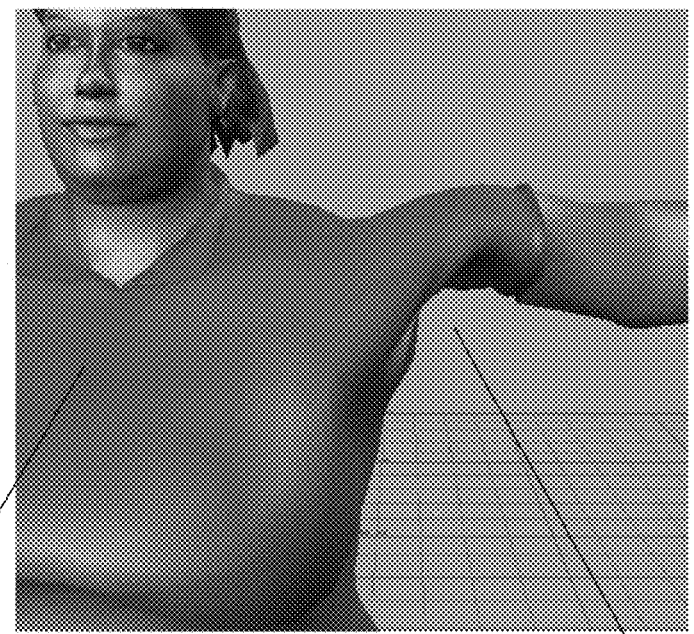
FIG. 6a is a rendering of a 3D mesh showing an artifact resulting from the application of a clothing mesh template to a 3D anatomical mesh in accordance with an embodiment of the invention.

When a generative model is used to generate models outside the boundaries of the training data set (e.g. characters that extrapolate from the data set as opposed to are interpolations of the data set), artifacts can appear at intersections between body parts, such as the armpits or groin. When a process such as Mean Value Coordinates is used to transfer information concerning the deformation of a 3D anatomical mesh to a clothed character that is an extrapolation of the data set (see discussion of rigging below), unwanted shapes can occur in regions that intersect in the 3D anatomical mesh. An example of such an unwanted shape is illustrated in FIG. 6*a*. The 3D character 600 includes a Mean Value Coordinate artifact in the form of a flattened armpit 602.

Figure 6B:
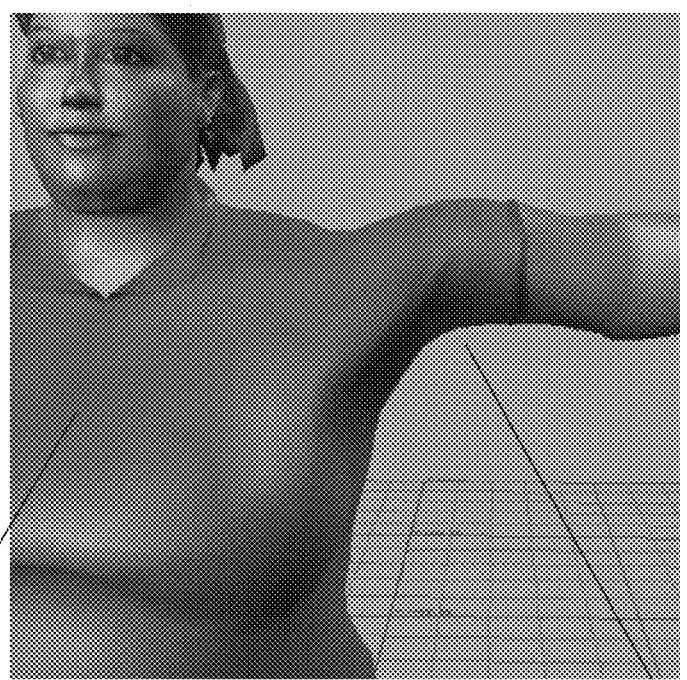
FIG. 6b is a rendering of the 3D mesh shown in FIG. 6b following application of a blend shape process to smooth artifacts introduced by the application of the clothing mesh template to the 3D anatomical mesh.

In a number of embodiments, processes are applied to remove artifacts resulting from the process of applying a clothing model to a 3D anatomical mesh. In several embodiments, an automated system for removing artifacts is created by observing the modifications made by a professional animator to correct the artifacts. A professional animator corrects artifacts that occur after the clothing mesh is applied to a generated 3D anatomical mesh. A blend shape based approach is then used to determine the deformations applied by the animator to remove the artifacts as a function of the model parameters used to generate the 3D anatomical mesh. The blend shape process can learn the extent to which blending is applied using a model such as, but not limited to, a linear model. Once the learning process is complete, depending upon the model parameters used to generate the base 3D anatomical mesh, the blend shape process can remove artifacts following the application of the clothing mesh to the 3D anatomical mesh. The results of applying an automated blend shape process to the mesh of the 3D character 600 shown in FIG. 6*a* in accordance with an embodiment of the invention is illustrated in FIG. 6*b*. As can be readily appreciated, the application of the blend shape process produces a 3D mesh 600' for the character in which an artifact was present in the armpit region 602' of the mesh is removed. Similar processes can be utilized in accordance with embodiments of the invention to remove other artifacts.

Figure 7:
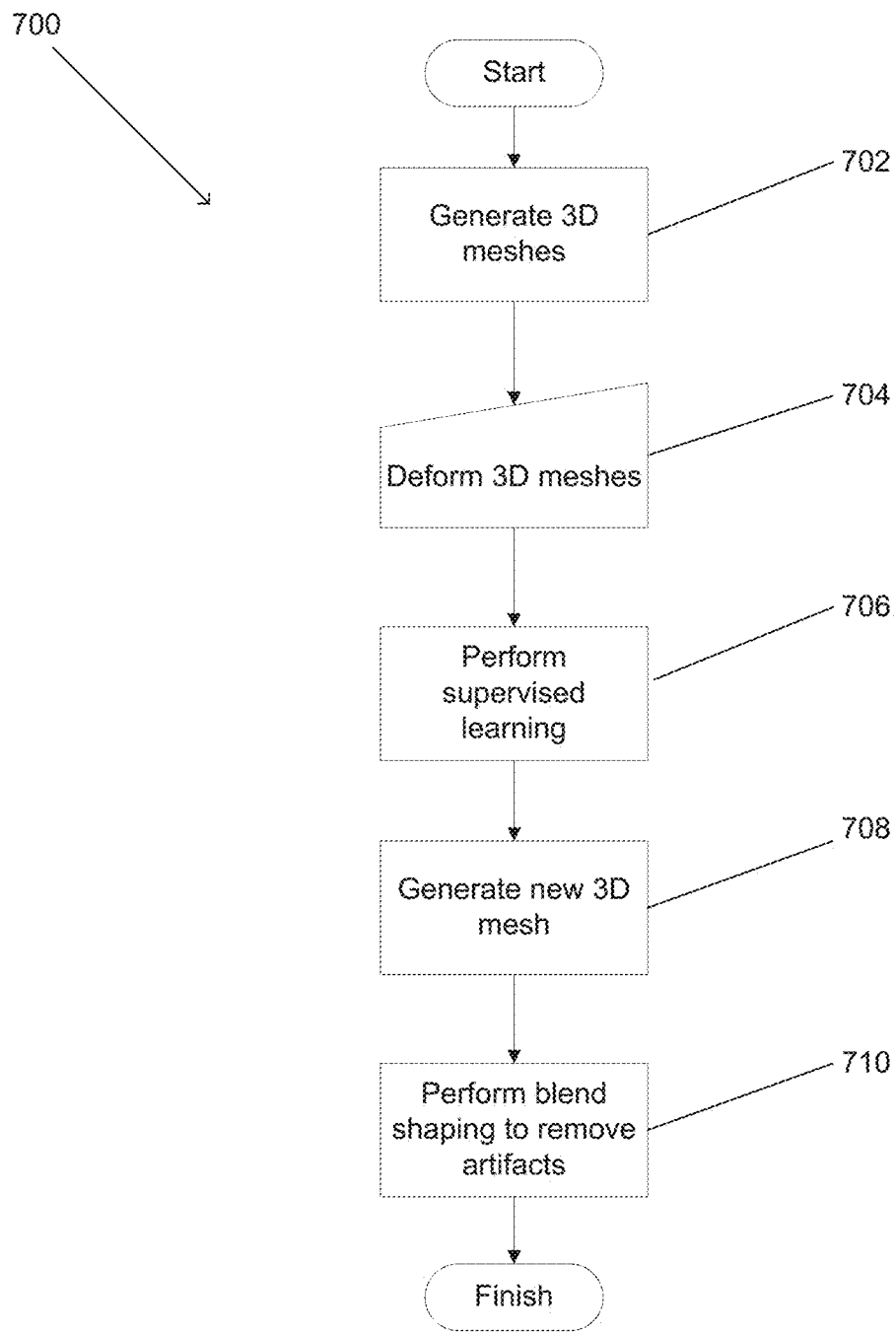
FIG. 7 is a flow chart illustrating a process for removing artifacts from 3D meshes generated by applying a clothing mesh template to a 3D anatomical mesh in accordance with an embodiment of the invention.

A process for removing artifacts following application of a clothing mesh template to a 3D anatomical mesh in accordance with an embodiment of the invention is illustrated FIG. 7. The process 700 includes generating (702) 3D meshes by applying clothing mesh templates to 3D anatomical models generated using a variety of different model parameters, deforming (704) the generated 3D meshes to eliminate artifacts, and performing (706) supervised learning to determine blending shapes and blending weights to apply based upon the model parameters of the 3D anatomical meshes. A new 3D clothed mesh can then be generated (708) by applying a clothing mesh template to a newly generated 3D anatomical model, and performing (710) blend shaping of the new 3D mesh shape based upon the model parameters used to generate the new 3D anatomical model. Although the process illustrated in FIG. 7 utilizes blend shaping, other processes suitable for specific applications can be utilized that eliminate artifacts in a 3D mesh resulting from application of a clothing mesh template to a 3D anatomical mesh in accordance with embodiments of the invention.

Adaptation of Skeleton to Clothed Mesh

In order to make a 3D character mesh created by applying a clothing mesh template to a 3D anatomical mesh animation-ready, the 3D character mesh is rigged by creating a skeleton for the 3D character mesh (i.e. the clothed mesh) and defining skinning weights. In a number of embodiments, a template skeleton is generated for each clothing mesh template and a process is applied to the skeleton to move the skeleton's joint centers based upon the shape of the clothed mesh generated by applying the clothing mesh template to a 3D anatomical mesh. In a number of embodiments, the adjustment of the template skeleton to rig the clothed mesh is performed using the Mean Value Coordinates algorithm. Mean value weights are computed for each joint of the skeleton, which are driven by the anatomical mesh deformation. In embodiments where a linear relationship exists between model parameters and the position of the mesh vertices, the skeleton joint position can be expressed as a linear function of semantic values (e.g. user's defined parameters).

Figure 8:
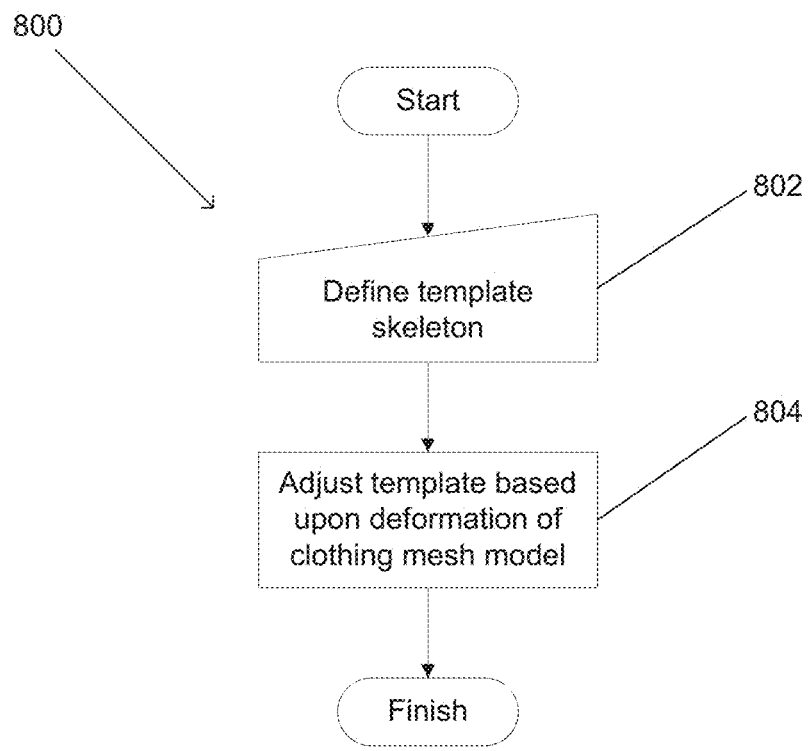
FIG. 8 is a flow chart illustrating a process for adjusting a template skeleton based upon the shape of a 3D mesh in accordance with an embodiment of the invention.

A process for adjusting a template skeleton in accordance with an embodiment of the invention is illustrated in FIG. 8. The process 800 includes defining a template skeleton 802 for each clothing mesh model and adjusting the appropriate template skeleton based upon the shape of a clothed mesh created by generating a 3D anatomical mesh using the generative model and applying a clothing mesh. In a number of embodiments, the adjustments are performed using Mean Value Coordinates algorithm to develop mean value weights that are driven by the deformation of the clothing mesh template. Although the above process assumes the application of a clothing mesh, similar processes can also be utilized to adjust a template skeleton in response to the shape of generated 3D anatomical meshes in the absence of an applied clothing mesh.

Although a specific process is illustrated in FIG. 8, other processes appropriate to a specific application can be utilized in accordance with embodiments of the invention.

Generation of Skinning Weights to Bind Clothing Mesh to Skeleton

In a number of embodiments, the process of generating the mesh for a 3D character model is constrained so that the same number of polygons is used to create the mesh of the 3D character irrespective of the shape of the 3D character. Therefore, skinning weights assigned for the clothed mesh of one 3D character can be applied to the clothed meshes of other 3D characters generated using the generative model. In many embodiments, an animator manually defines the skinning weights for a clothing mesh template for 3D characters generated using the generative model and then the same skinning weights are used to rig the clothed meshes of all 3D characters created using the generative model. By simply applying previously generated skinning weights to a newly generated mesh, an animation-ready 3D character model can be generated in accordance with an embodiment of the invention and rigged in real time.

Figure 9:
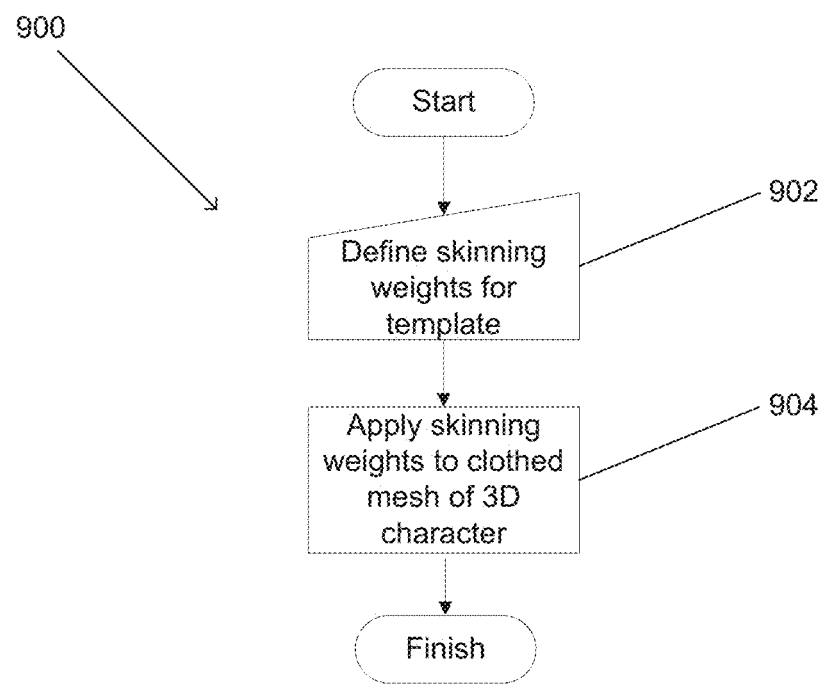
FIG. 9 is a flow chart illustrating a process for applying pre-defined skinning weights to rig a 3D mesh in accordance with an embodiment of the invention.

A process for assigning skinning weights to the mesh of a 3D character model generated in accordance with an embodiment of the invention is illustrated in FIG. 9. The process 900 includes manually defining (902) skinning weights for a clothing mesh template for 3D anatomical meshes generated using a generative model. Ideally, the skinning weights are defined with respect to the 3D clothed mesh template. However, the skinning weights can be defined with respect to the base 3D anatomical mesh generated by the generative model and transferred over to the clothed mesh template. When a clothed mesh for a new 3D character is created by using the generative model to generate a 3D anatomical mesh and then applying (904) the clothing mesh template to the 3D anatomical mesh, the character can be rigged by applying the defined skinning weights to the clothed mesh of the new 3D character.

Although a specific process is described above for applying predefined skinning weights to clothed meshes of 3D characters in reliance upon polygon correspondence between the clothed mesh and a clothing mesh template, other processes for automatically generating skinning weights where similar constraints do not apply can be utilized in rigging the meshes of 3D characters in accordance with embodiments of the invention. However, such processes typically cannot simply apply a previously defined set of skinning weights to a newly generated clothed mesh.

Texture Editing

In many embodiments, a user interface is provided that enables the real time editing of the texture of a clothed mesh generated by applying a clothing mesh to a 3D anatomical mesh. In several embodiments, the texture color components are brought into a suitable color space (e.g. Hue, Saturation & Value) in order to better decouple the chromatic and brightness components. Binary or smooth masks can be used to separate the texture into regions that can be separately edited. In a number of embodiments, a user interface can be provided including controls that enable a user to directly change the relative pixel hue component for each texture-region. Additional controls can be provided that enable the modification of the value and saturation component relative to the original value of the texture-region. In this way, high frequency texture information (e.g. shadows and discoloration effects) are preserved. Although specific techniques for modifying the texture of a 3D character are described above, any of a variety of techniques can be utilized to modify the texture of a 3D character in accordance with embodiments of the invention.

Real Time Generation and Iterative Design

Generation of animation-ready 3D character models in accordance with the processes outlined above can be performed in real time and an interactive user interface used iteratively to display the 3D character and to receive inputs from the user for the generation of a new animation-ready 3D character model based upon modifications to the model parameters defining the previous animation-ready 3D character model. When finalized, the animation-ready 3D character model can be animated using motion data and/or downloaded or stored for use in a variety of formats.

Figure 10:
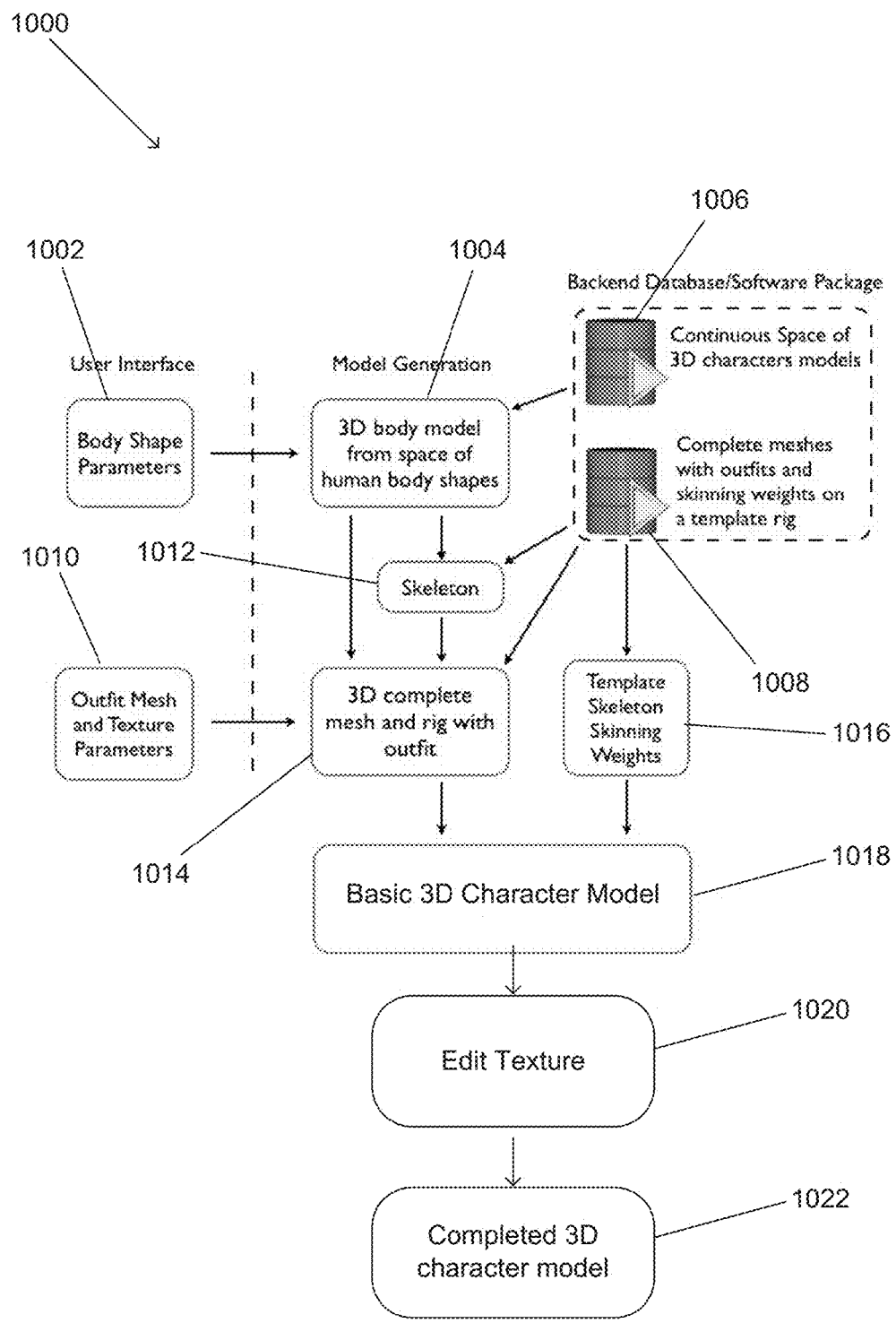
FIG. 10 is a flow diagram conceptually illustrating a process for creating an animation-ready 3D character model in accordance with an embodiment of the invention.

A workflow for generating an animation ready 3D character in accordance with an embodiment of the invention is illustrated in FIG. 10. As is illustrated in the workflow 1000, the user provides (1002) body shape or model parameters that enable the generation of a 3D anatomical mesh. The 3D anatomical mesh is generated (1004) based upon a model created using a database 1006 representative of a continuous space of 3D character shapes. The database also includes previously defined clothing mesh templates 1008 that include a clothing mesh and skinning weights defined with respect to a template skeleton. Based upon clothing and/or texture parameters selected by the user, the workflow adjusts (1012) the stored template skeleton for the selected clothes based upon the shape of the 3D anatomical mesh generated by the generative model. The appropriate clothing mesh template corresponding to the selected clothing is applied to the 3D anatomical mesh, which is rigged (1014) using the adjusted template skeleton. The template skeleton skinning weights are then applied (1016) to the rigged mesh to complete the basic 3D character 1018. The process can iterate by modifying the body shape parameters and clothing parameters until the 3D character is satisfactory. As part of the editing process, the texture of the clothed mesh can be edited (1020). When a satisfactory 3D character model has been created (1022), the workflow completes. Although a specific workflow is illustrated in FIG. 10, other workflows appropriate to a specific application can also be utilized in accordance with embodiments of the invention.

Figure 11:
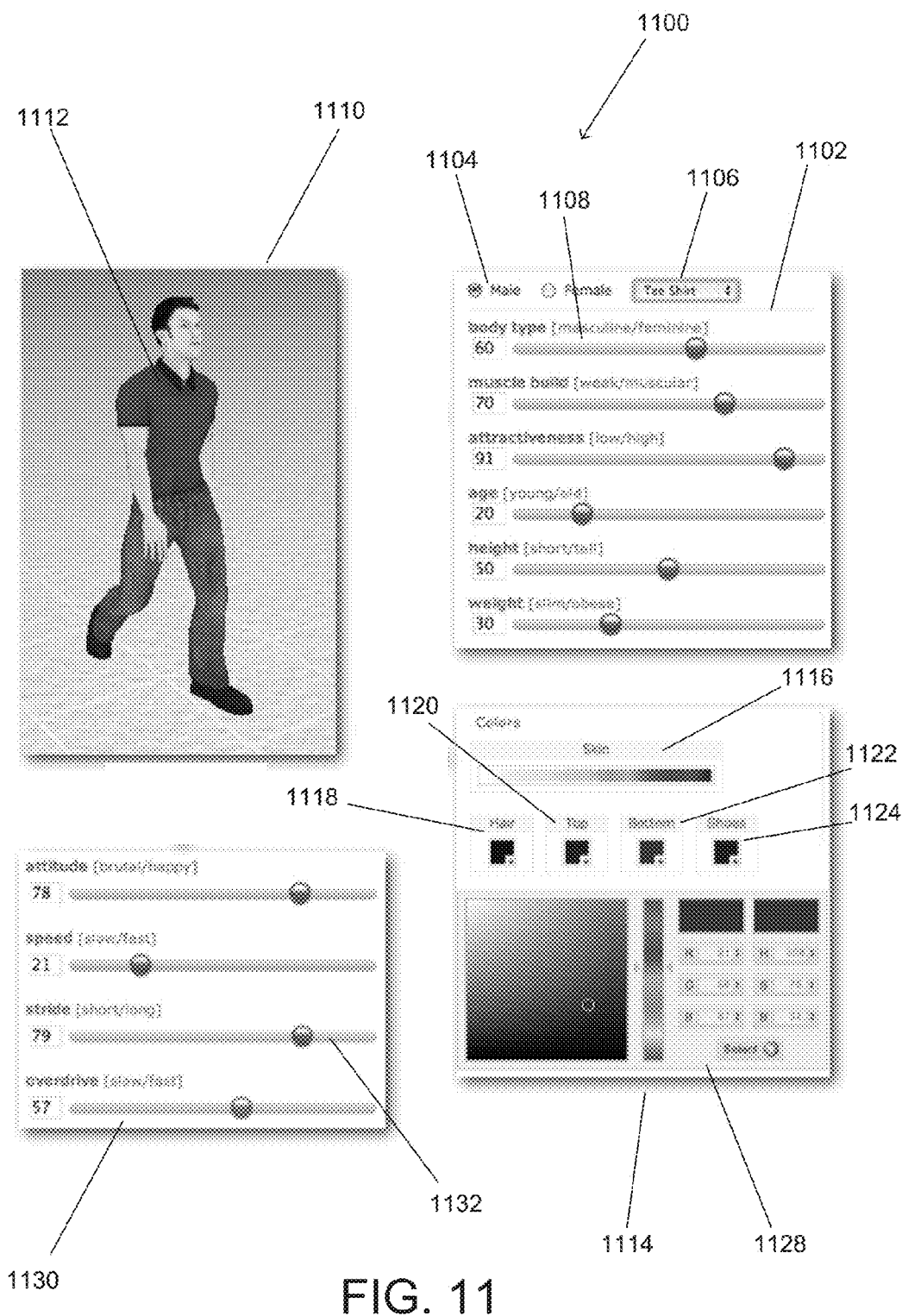
FIG. 11 conceptually illustrates a user interface for the real time generation and editing of 3D characters in accordance with an embodiment of the invention.

A user interface that can be utilized to generate and edit a 3D character model in real time in accordance with embodiments of the invention is illustrated in FIG. 11. The user interface 1100 includes a first set of controls 1102 that can be used to provide a high level description enabling the generation of a 3D character. In the illustrated embodiment, the user interface provides a selection 1104 of gender, a pull down list 1106 of clothing meshes, and a number of sliders 1108 that can be used to define the characteristics of the underlying 3D anatomical model. The user interface also includes a display window 1110 in which a 3D character generated in real time based upon the high level description provided via the first set of controls 1102 is displayed. The texture of the clothed mesh can be edited using a second set of controls 1114. The second set of controls 1114 includes a separate control for each of a number of separately defined texture-regions. In the illustrated embodiment, the regions include skin 1116, hair 1118, top 1120, bottom 1122, and shoes 1124. In other embodiments, any of a variety of different texture-regions appropriate to a specific clothed mesh or 3D character can be defined and controlled via the user interface. For each region, the user interface 1100 provides a control 1128 enabling the selection of an appropriate color. As is discussed above, the generated 3D character can be animated using motion data. In the illustrated embodiment, a third set of controls 1130 is also provided enabling the generation of synthetic motion data to animate the generated 3D character. In the illustrated embodiment, a variety of sliders 1132 are provided enabling control of different characteristics of the synthetic motion data used to animate the 3D character. Although a specific user interface is illustrated in FIG. 11, any of a variety of user interfaces providing any range of different controls appropriate to a specific application can be utilized in accordance with embodiments of the invention.

The present invention has been described above with respect to many specific embodiments, however, a variety of additional modifications and variations would be apparent to those skilled in the art. For example, many of the processes described above assume the automation of many steps that were previously performed manually by animators. In many embodiments, a single step in an animator's workflow is automated using one of the processes outlined above and/or additional techniques can be utilized to further automate the generation of animation-ready 3D characters. Thus, embodiments of the present invention should be considered in all respects as illustrative and not restrictive.

What is claimed:

1. A system for automatically generating animation-ready three-dimensional (3D) characters, the system comprising:
   at least one processor on an application server; and
   at least one non-transitory computer readable storage medium storing instructions that, when executed by the at least one processor, cause the application server to:
   receive user defined model parameters and a clothing selection via a user interface;
   generate a 3D mesh of a 3D character based on a generative model and the user defined model parameters, wherein the generated 3D mesh of the 3D character has a one-to-one polygon correspondence with the generative model such that the generated 3D mesh has the same number of polygons as the generative model;
   select, based on the clothing selection, a clothing mesh template from a plurality of clothing mesh templates, wherein the clothing mesh template has the one-to-one polygon correspondence with the generative model such that the clothing mesh template has the same number of polygons as the generative model;
   apply, based on the clothing mesh template having the same number of polygons as the generated 3D mesh of the 3D character, the clothing mesh template to the generated 3D mesh of the 3D character to create an animation-ready 3D character fitted with the clothing selection; and
   provide the animation ready 3D character fitted with the clothing selection via the user interface.

2. The system of claim 1, wherein the clothing mesh template comprises a clothing mesh, a template skeleton, and skinning weights, and wherein the application server applies the clothing mesh template to the generated 3D mesh of the 3D character by applying the clothing mesh from the clothing mesh template to the generated 3D mesh of the 3D character to create the animation-ready 3D character that is fitted with the clothed mesh of the clothing selection.

3. The system of claim 2, further comprising instructions that, when executed by the at least one processor, cause the application server to:
   adjust the template skeleton of the clothing mesh template corresponding to the user defined model parameters and the clothing selection to fit the clothed mesh; and
   generating modified skinning weights from the skinning weights of the clothing mesh template corresponding to the user defined model parameters and the clothing selection to fit the clothed mesh.

4. The system of claim 3, wherein the clothing mesh template includes UV mappings used to map texture to the clothing mesh, and
   further comprising instructions that, when executed by the at least one processor, cause the application server to apply modified textures to the clothed mesh utilizing the UV mappings and the user clothing selection.

5. The system of claim 2, further comprising instructions that, when executed by the at least one processor, cause the application server to generate a web based user interface to serve as the user interface.

6. The system of claim 5, further comprising instructions that, when executed by the at least one processor, cause the application server to generate the animation-ready 3D character in real time in response to receipt of the user defined model parameters and the clothing selection via the web based user interface.

7. The system of claim 2, further comprising instructions that, when executed by the at least one processor, cause the application server to apply the clothing mesh template to the generated 3D mesh of the 3D character using a Mean Value Coordinates calculation that deforms vertices of the clothing mesh template in response to a location of the vertices of the generated 3D mesh of the 3D character.

8. The system of claim 7, further comprising instructions that, when executed by the at least one processor, cause the application server to apply a blend shape process to correct artifacts in the clothed mesh introduced by the Mean Value Coordinates calculation.

9. The system of claim 7, further comprising instructions that, when executed by the at least one processor, cause the application server to adjust the template skeleton based upon a deformation of the clothing mesh template using the Mean Value Coordinates calculation.

10. The system of claim 2, further comprising instructions that, when executed by the at least one processor, cause the application server to apply the clothing mesh template to the generated 3D mesh of the 3D character by morphing the clothing mesh template into the generated 3D mesh of the 3D character using a non-rigid mesh registration process.

11. The system of claim 2, further comprising instructions that, when executed by the at least one processor, cause the application server to use masks to separate the clothed mesh into regions.

12. The system of claim 11, wherein color components of each region are represented in a Hue, Saturation, and Value color space.

13. The system of claim 1, wherein the generative model is produced by principal component analysis of a data set of 3D meshes; and
further comprising instructions that, when executed by the at least one processor, cause the application server to:
transform the user defined model parameters in terms of principal components of the generative model; and
generate the generated 3D mesh of the 3D character using the transformed user defined model parameters and the generative model.

14. The system of claim 1, wherein the user defined model parameters comprise anatomical characteristics.

15. The system of claim 14, wherein the generative model is generated from a set of example 3D meshes that have labeled anatomical characteristics and polygon correspondence with one another, and wherein the generative model maps the anatomical characteristics to each of the set of example 3D meshes.

16. A method for generating animation-ready three-dimensional (3D) characters, the method comprising:
receiving user defined model parameters and a clothing selection via a user interface;
generating, by at least one processor, a 3D mesh of a 3D character based on a generative model and the user defined model parameters, wherein the generated 3D mesh of the 3D character has a one-to-one polygon correspondence with the generative model such that the generated 3D mesh has the same number of polygons as the generative model;
selecting, based on the clothing selection, a clothing mesh template from a plurality of clothing mesh templates, wherein the clothing mesh template has the one-to-one polygon correspondence to the generative model such that the clothing mesh template has the same number of polygons as the generative model;
applying, based on the clothing mesh template having the same number of polygons as the generated 3D mesh of the 3D character based on the clothing mesh template and the generated 3D mesh of the 3D character having the one-to-one polygon correspondence to the generative model, the clothing mesh template to the generated 3D mesh of the 3D character to create an animation-ready 3D character that is fitted with a clothed mesh of the clothing selection; and
providing the animation ready 3D character fitted with the clothed mesh of the clothing selection via the user interface.

17. The method of claim 16, wherein generating the generated 3D mesh of the 3D character based upon the user defined model parameters further comprises:
generating the generative model by principal component analysis of a data set of 3D meshes;
mapping, at an application server, the user defined model parameters to principal components of the generative model; and
generating, at the application server, the generated 3D mesh of the 3D character based upon the mapped user defined model parameters and the generative model.

18. The method of claim 16, further comprising:
rigging the clothed mesh by:
adjusting a template skeleton of the clothing template mesh based on the clothing selection, and
generating skinning weights based upon skinning weight of the clothing mesh template and the clothing selection; and
applying the rigged clothed mesh to the generated 3D mesh of the 3D character to generate the animation-ready 3D character.

19. The method of claim 18, wherein the user defined model parameters comprise anatomical characteristics.

20. The method of claim 16, further comprising:
receiving at least one texture selection via the user interface; and
modifying a texture region of the clothed mesh in response to the at least one texture selection.

* * * * *